United States Patent [19]

Hashimoto

[11] Patent Number: 5,479,257
[45] Date of Patent: Dec. 26, 1995

[54] METHOD OF AND APPARATUS FOR DETECTING OBJECT POSITION USING A FOURIER TRANSFORM OF THE OBJECT IMAGE AND PROCESSING SYSTEM USING THE SAME

[75] Inventor: Takeshi Hashimoto, Hidaka, Japan

[73] Assignee: Olympus Optical Co., Ltd., Tokyo, Japan

[21] Appl. No.: 222,959

[22] Filed: Apr. 5, 1994

[30] Foreign Application Priority Data

Apr. 5, 1993 [JP] Japan .................................. 5-078022

[51] Int. Cl.⁶ .................................................. G01B 9/021
[52] U.S. Cl. ........................ 356/347; 356/354; 382/210; 382/278; 382/279
[58] Field of Search ........................ 356/347, 348, 356/363, 354; 359/29, 30, 31; 382/31, 42

[56] References Cited

U.S. PATENT DOCUMENTS

| | | | |
|---|---|---|---|
| 4,164,788 | 8/1979 | Jain | 356/167 |
| 4,304,458 | 12/1981 | Huignard et al. | 356/347 |
| 4,516,833 | 5/1985 | Fusek | 359/29 |
| 4,835,088 | 5/1989 | Gilson | 359/558 |
| 4,843,631 | 6/1989 | Steinpichler et al. | 382/43 |
| 4,860,253 | 8/1989 | Owechko | 356/347 |
| 4,921,352 | 5/1990 | Adolfs et al. | 356/347 |
| 4,929,081 | 5/1990 | Yamamoto | 356/347 |
| 5,282,067 | 1/1994 | Liu | 359/29 |

*Primary Examiner*—Samuel A. Turner
*Attorney, Agent, or Firm*—Cushman, Darby & Cushman

[57] ABSTRACT

An object position detecting method and apparatus whereby even an image subjected to deformation such as shift, rotation, scaling, etc., can be recognized with high accuracy. Also disclosed is an image processing system that uses the object position detecting method and apparatus. The object position detecting apparatus is composed of an image input device (5), a Fourier transform device (6) for performing Fourier transform on an input object image, a reference beam device (7) for generating a reference beam, a recording device (8) for recording a wavefront formed by interference between the Fourier transform information on the input object image and the reference beam, thereby producing a Fourier transform hologram, a read device (9) for reading the recorded Fourier transform hologram by using the Fourier transform information on the input object image, an inverse Fourier transform device (10) for subjecting the read information to inverse Fourier transform, and a detecting device (11) for detecting the information having been subjected to the inverse Fourier transform, thereby obtaining the position of the object to be recognized.

15 Claims, 13 Drawing Sheets

○ Information of Exp.(7)
□ Information of Exp.(5)
△ Information of Exp.(6)

METHOD OF AND APPARATUS FOR DETECTING OBJECT POSITION USING A FOURIER TRANSFORM OF THE OBJECT IMAGE AND PROCESSING SYSTEM USING THE SAME

BACKGROUND OF THE INVENTION

The present invention relates to a method of and apparatus for detecting the position of an object, and also relates to an image processing system using the object position detecting method and apparatus.

There are strong needs for image recognition apparatuses, including visual apparatus for industrial robots and product inspection apparatus for automation lines. Accordingly, development of recognition apparatuses such as those based on a correlator that uses an optical matched spatial filter has heretofore been exhaustively carried out. Recently, recognition apparatuses that use a neural network have also been actively developed. However, these conventional recognition apparatuses are inferior in generalizability, that is, capability of recognizing images having been subjected to deformation, e.g., shift, rotation, scaling, etc. Therefore, an improvement in the generalizability has been the most important problem to be solved to allow the recognition apparatuses to be put to practical use.

One solution to the problem was proposed by David Casasent et al. with Carnegie Melon University (see David Casasent et al. "Real-time deformation invariant optical pattern recognition using coordinate transformations", Appl. Opt., Vol. 26, pp. 938–942 (1987)). Their method, which uses a correlator, is as follows: As shown in FIG. 14, first, an input image 101 is illuminated with coherent light 102, and phase information for a coordinate transformation is superimposed on the input image information by a computer-generated hologram (CGH) 103. Then, the resulting image information is subjected to Fourier transform by a Fourier transform lens $L_1$ 104. Thus, information containing the input image having been subjected to a desired coordinate transformation is obtained on a coordinate transformation surface 105. In the case of the above-mentioned literature, for example, the desired coordinate transformation is a logarithmic polar coordinate transformation wherein even if deformation such as scaling or rotation occurs on the input image, such deformation is transformed into an amount of shift.

Next, as shown in FIG. 15, the information having been subjected to the logarithmic polar coordinate transformation is input to a liquid crystal television (LCTV) 106 and illuminated with coherent light 110, thereby being made incident on a shift-invariant correlation optical system comprised of a combination of a double-diffraction system, which is composed of two Fourier transform lenses $L_2$ 107 and $L_3$ 108, and a matched spatial filter (MSF) 109 formed by subjecting a reference image to a logarithmic polar coordinate transformation similar to the above. Then, a correlation peak of the reference image and the inspective image on a correlation plane P is detected by a camera 111, thereby recognizing the optical patterns of the input image. Actually, Casasent et al. report in an example that favorable collating results were obtained with respect to rotation and scaling deformation by using the above-described method.

Further, Kenneth H. Fielding et al. with US Air Force Institute of Technology propose a recognition method attained by developing the above-described method and report in an example that favorable collating results were obtained with respect to shift deformation in addition to rotation and scaling by transforming the input image into a Fourier spectrum (the product of the Fourier transform of the input image and its conjugate information) before subjecting it to processing similar to the above, although no detailed description of the method is made in their report (see Kenneth H. Fielding et al. "Position, scale and rotation invariant holographic associative memory", Opt. Eng., Vol. 28, pp. 849–853 (1989)).

According to the method of Fielding et al., attained by developing the method of Casasent et al. so as to add thereto generalizability for shift deformation, the Fourier spectrum of the input image is subjected to a coordinate transformation before being used for recognition. However, information in the vicinity of zero-order light, which has a high spectral intensity, is relatively similar to one another irrespective of the type of input image. Therefore, recognition of the input image is largely affected by the information in the vicinity of zero-order light even if there is a difference in the other portions of the input image, resulting in a large recognition error. Further, because of the operation of obtaining a product of the Fourier transform of the input image and its conjugate information, which is added to the process of obtaining a Fourier spectrum, Fourier transform information on the input image is lacking information about phase and information about negative amplitude. Thus, recognition cannot be performed with complete information. Therefore, a large recognition error may occur depending upon the type of input image.

SUMMARY OF THE INVENTION

In view of the above-described circumstances, it is an object of the present invention to provide an object position detecting method and apparatus whereby even an image subjected to deformation such as shift, rotation, scaling, etc., can be recognized with high accuracy, and also provide an image processing system that uses the object position detecting method and apparatus.

To attain the above-described object, the present invention provides an object position detecting method wherein the position of an input object image is detected by using a convolution image of the input object image.

In addition, the present invention provides an object position detecting method wherein the position of an input object image is detected by reading a Fourier transform hologram of the input object image by use of Fourier transform information on the input object image and subjecting the read information to inverse Fourier transform.

In addition, the present invention provides an object position detecting apparatus having an image input device for taking an input object image into the apparatus, a Fourier transform device for performing Fourier transform on the input object image taken into the apparatus to obtain Fourier transform information, a device for generating a reference beam for producing a hologram by using a desired carrier, a device for recording a wavefront formed by interference between the Fourier transform information on the input object image and the reference beam, thereby producing a Fourier transform hologram, a device for reading the recorded Fourier transform hologram by using the Fourier transform information on the input object image, an inverse Fourier transform device for subjecting the read information to inverse Fourier transform, and a device for detecting the information having been subjected to the inverse Fourier transform.

In addition, the present invention provides an object position detecting apparatus having an image input device for taking an input object image into the apparatus, a Fourier transform device for performing Fourier transform on the input object image taken into the apparatus, a multiplying device for squaring the Fourier transform information on the input object image obtained by the Fourier transform device, an inverse Fourier transform device for subjecting the squared Fourier transform information to inverse Fourier transform to obtain convolution information on the input object image, and a device for detecting the convolution information.

In addition, the present invention provides an image processing system having an imaging device which includes an imaging optical system for forming an image of an input object as an optical image, and a photoelectric transducer for converting the formed optical image into an electric signal to obtain an input object image signal, and an object position detecting device for detecting the position of the input object.

In addition, the present invention provides an image processing system having an imaging device for inputting information on an input object as an image, an object position detecting device for detecting the position of the input object, and a device for moving the imaging device on the basis of the position of the object obtained by the object position detecting device.

In addition, the present invention provides an image processing system having an imaging device for inputting information on an input object as an image, an object position detecting device for detecting the position of the input object, a device for moving the imaging device on the basis of the position of the object obtained by the object position detecting device to thereby move the input object onto an optical axis, and a device for performing recognition on the basis of information on the input object moved onto the optical axis by the moving device.

As shown in the block diagram of FIG. 1, the image processing system of the present invention is composed of an imaging device 1 for inputting information on an input object as an image, an object position detecting device 2 for detecting the position of the object input by the imaging device 1, a moving device 3 for moving the imaging device 1 on the basis of the position of the object obtained by the object position detecting device 2 to thereby move the object onto an optical axis, and a recognition device 4 for performing recognition on the basis of information on the object moved onto the optical axis by the moving device 3, thereby solving the above-described problems and thus attaining the object of the present invention.

With the above-described arrangement, the position (amount and direction of shift from the optical axis) of an input object to be recognized is detected, and the imaging device 3 is moved on the basis of the position information to thereby move the object information onto the optical axis. Thus, the object information moved onto the optical axis can be sent to the recognition device 4. In other words, no matter where on the input screen the object is located, the identical object information can be sent to the recognition device 4. Accordingly, it is possible to realize an improvement in generalizability for shift deformation without a deficiency of information. If the above-described method of Casasent et al. is used in the recognition device 4, it is possible to obtain generalizability for other deformation, i.e., rotation and scaling, in addition to shift deformation. Accordingly, it is possible to provide a novel image processing system capable of highly accurately collating and recognizing even an image subjected to deformation such as shift, rotation or scaling.

First, the object position detecting method that is used in the object position detecting device 2, which is at the core of the image processing system of the present invention and which is adapted for detecting the position (amount and direction of shift from the optical axis) of an input object, will be described below in detail.

With an origin taken on an optical axis, an input image of an object to be recognized is assumed to be $g(x,y)$, while an image of the object of recognition when it lies on the optical axis is assumed to be $f(x,y)$. Considering that the image $f(x,y)$ of the object $g(x,y)$ of recognition has shifted from the origin by $(a,b)$, the object $g(x,y)$ may be written as follows:

$$g(x,y) = f(x-a, y-b) \qquad (1)$$
$$= f(x,y) * \delta(x-a, y-b)$$

where "$*$" represents convolution integration.

Next, assuming that Fourier transform information on the object $g(x,y)$ is $G(u,v)$, and a reference beam is $R(u,v)$, a Fourier transform hologram containing the record of interference between the two wavefronts has information given by $$|G|^2 + |R|^2 + G^* \cdot R + G \cdot R^* \qquad \ldots (2)$$

where "$*$" represents complex conjugate, and "$\cdot$" represents multiplication.

For simplification, variables which are not related to the description will hereinafter be omitted.

If the Fourier transform hologram represented by the expression (2) is read by using Fourier transform information $G(u,v)$ on the input object, the read information is given by $$(|G|^2 + |R|^2) \cdot G + G^* \cdot G \cdot R + G \cdot G \cdot R^* \qquad \ldots (3)$$

If this information is subjected to inverse Fourier transform, the following information is obtained:

$$F^{-1}\{(|G|^2+|R|^2) \cdot G + G^* \cdot G \cdot R + G \cdot G \cdot R^*\} \qquad \ldots (4)$$

where "$F^{-1}$" represents inverse Fourier transform.

Next, let us examine the expression (4) for each term. First, the first term is given by $$F^{-1}\{(|G|^2+|R|^2) \times G\} \qquad (5)$$
$$= F^{-1}\{(|G|^2+|R|^2)\} * g$$
$$= F^{-1}\{(|G|^2+|R|^2)\} * f * \delta(x-a, y-b)$$

The expression (5) shows that an image, in which the DC component (what is called "zero-order component") of the Fourier transform hologram is superimposed on the image $f(x,y)$ of the object of recognition when it lies on the optical axis, appears in the direction of travel of the Fourier transform information $G(u,v)$ during the hologram recording process, and that the position of the image is away from the position of the object information when it lies on the optical axis by the amount of shift $(a,b)$.

The second term is given by $$F^{-1}\{G^* \cdot G \cdot R\} = g^* * g * r = f^* * f * r \qquad \ldots (6)$$

It should be noted that the Fourier transform information on the reference beam $R(u,v)$ is herein expressed as $r(x,y)$.

The expression (6) shows that a correlation image of the image $f(x,y)$ of the object of recognition when it lies on the optical axis appears in the direction of travel of the reference beam $R(u,v)$ during the Fourier transform hologram recording process, and that the position of the image is the same as the position of the object information when it lies on the optical axis.

The third terms is given by $$F^{-1}\{G \times G \times R^*\} = g \tilde{*} g \tilde{*} r^*  \quad (7)$$
$$= f \tilde{*} f \tilde{*} \delta(x-2a, y-2b) \tilde{*} r^*$$

The expression (7) shows that a convolution image of the image f(x,y) of the object of recognition when it lies on the optical axis appears in a direction conjugated with the direction of travel of the reference beam R(u,v) during the Fourier transform hologram recording process, and that the position of the convolution image is away from the position of the object information when it lies on the optical axis by double the amount of shift (a,b).

As shown by the expressions (5) to (7), according to the object position detecting method of the present invention, the Fourier transform hologram of the input object image is read out by using the Fourier transform information on the input object image and then subjected to inverse Fourier transform. With this method, if the information represented by the expression (5) is detected in the direction of travel of the Fourier transform information G(u,v) during the hologram recording process, since the position of the information is away from the position of the object information when it lies on the optical axis by the amount of shift (a,b), it is possible to detect the position of the object of recognition, that is, the amount and direction of shift from the position of the object when it lies on the origin (the optical axis), by detecting the position of the information.

Further, if the convolution information represented by the expression (7) is detected in the direction conjugated with the direction of travel of the reference beam R(u,v) during the Fourier transform hologram recording process, since the position of the information is away from the position of the object information when it lies on the optical axis by double the amount of shift (a,b), it is possible to detect the position of the object of recognition, that is, the amount and direction of shift from the position of the object when it lies on the origin (the optical axis), by detecting the position of the information and halving it.

In the foregoing description of the object position detecting method, a series of procedures for obtaining the object position have been explained by using the expressions (3) to (7). The following is a description of the object position detecting apparatus for realizing the object position detecting method. As shown in FIG. 2, the object position detecting apparatus is composed, at least, of an image input device 5 for taking an input object image into the apparatus, a Fourier transform device 6 for performing Fourier transform on the input object image taken into the apparatus to obtain Fourier transform information, a reference beam device 7 for generating a reference beam for producing a hologram by using a desired carrier, a recording device 8 for recording a wavefront formed by interference between the Fourier transform information on the input object image and the reference beam, thereby producing a Fourier transform hologram, a read device 9 for reading the recorded Fourier transform hologram by using the Fourier transform information on the input object image, an inverse Fourier transform device 10 for subjecting the read information to inverse Fourier transform, and a detecting device 11 for detecting the information having been subjected to the inverse Fourier transform.

It will be clear from the above description of the object position detecting method that by the object position detecting apparatus, the Fourier transform hologram of the object to be recognized is recorded and read out by using the Fourier transform information on the input object image, and the read information is subjected to inverse Fourier transform, thereby obtaining the position of the object of recognition.

Among the expressions (3) to (7) used to explain a series of procedures for obtaining the object position in the foregoing description of the object position detecting method, the expression (7) will be further examined below. It will be understood that the convolution information can be obtained by squaring the Fourier transform information on the object of recognition, obtained by Fourier-transforming the object, (i.e., multiplying the Fourier transform information by 2 unlike the prior art in which the Fourier transform of the input image and its conjugate information are multiplied together), and then subjecting the square to inverse Fourier transform. Next, an object position detecting apparatus for realizing the object position detecting method by obtaining convolution information will be explained below. As shown in the block diagram of FIG. 3, the apparatus is composed, at least, of an image input device 5 for taking an input object image into the apparatus, a Fourier transform device 6 for performing Fourier transform on the input object image taken into the apparatus, a multiplying device 12 for squaring the Fourier transform information on the input object image obtained by the Fourier transform device 6, an inverse Fourier transform device 10 for subjecting the squared Fourier transform information to inverse Fourier transform to obtain convolution information on the input object image, and a detecting device 11 for detecting the convolution information. It will be clear from the foregoing description that by the object position detecting apparatus, convolution information on the object to be recognized can be obtained, and hence the position of the object of recognition can be obtained.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Specific examples for realizing the present invention will be described below. First of all, the object position detecting apparatus for realizing the object position detecting method, which is used in the above-described object position detecting device 2 in the image processing system, will be explained below in detail by way of first to fourth embodiments.

First Embodiment

Figure 4:
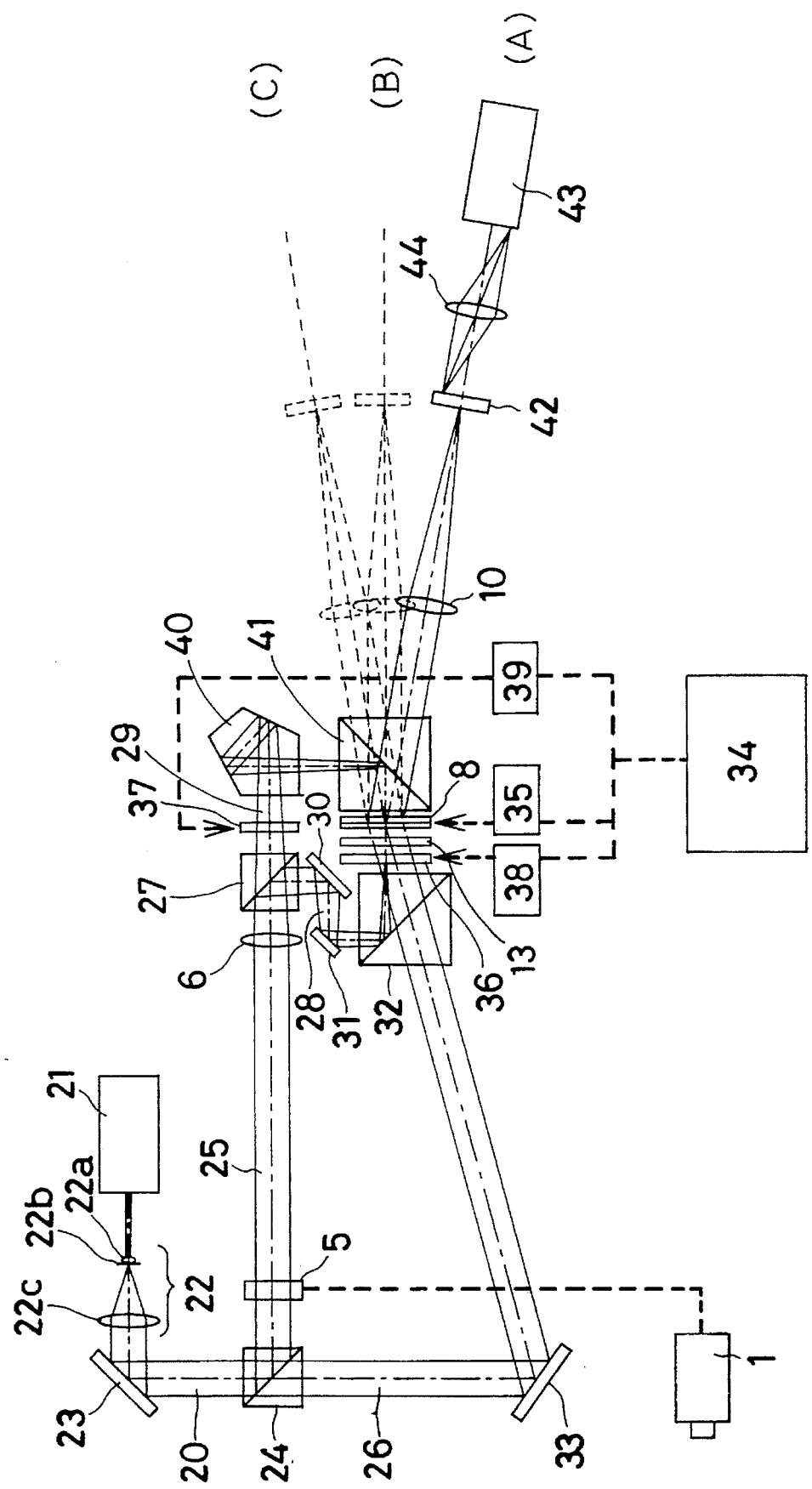
FIG. 4 shows an optical system of an object position detecting apparatus according to a first embodiment of the present invention.

A first embodiment of the present invention will be explained below with reference to FIG. 4, which shows the optical system thereof. An approximately parallel beam of light 20 is generated by a coherent light source 21 and a beam expander 22. As the coherent light source 21, any light source having coherence sufficient to generate hologram interference fringes of high contrast can be used. In this embodiment, an argon laser of wavelength 514.5 nm is used as an example. The beam expander 22 is formed by using a stop-down lens 22a, a pinhole 22b and a collimator lens 22c, as in the usual practice. The approximately parallel beam 20 is reflected by a mirror 23, which is installed for the purpose of making the optical system compact. Thus, the optical path of the beam 20 is bent. Thereafter, the beam 20 is split by a beam splitter 24 into two beams, that is, a write-read beam 25 and a reference beam 26. The write-read beam 25 enters an image input device 5 where information on an object to be recognized, which is taken by an imaging device 1 is input to the write-read beam 25, and then the beam 25 is input to the apparatus. As the imaging device 1, any type of imaging device capable of imaging a two-dimensional image can be used, whether a tube-type imaging device or a solid-state imaging device. In this embodiment, however, a CCD camera equipped with a zoom lens is used. An image of the object of recognition, which is imaged by the CCD is converted into a TV signal, e.g., an NTSC TV signal, by the circuit built in the camera. To take in this signal and give the write-read beam 25 image information in the form of changes in intensity, an electrically addressed spatial light modulator is used as the image input device 5. In this embodiment, the image input device 5 is a transmissive type liquid crystal display device, which has recently been used in CRTs for TVs and computers.

The write-read beam 25 having the object information superimposed thereon passes through a Fourier transform lens serving as a Fourier transform device 6 and is then split by a beam splitter 27 into a write beam 28 and a read beam 29. Of the two beams, the write beam 28 is applied to the surface of a reflective type spatial light modulator serving as a recording device 8 via mirrors 30 and 31 and a beam splitter 32. On the surface of the reflective type spatial light modulator, that is, the recording device 8, the information on the object to be recognized has already been transformed into Fourier transform information by the Fourier transform device 6. Examples of reflective type spatial light modulators usable as the recording device 8 include those which use a photorefractive crystal, e.g., BSO ($Bi_{12}SiO_{20}$), those which use a TN (Twisted Nematic) liquid crystal, a ferroelectric liquid crystal, etc., those which use an inorganic substance, e.g., LN ($LiNbO_3$), DKDP ($KD_2PO_4$), etc., those which use a magnetic substance, e.g., YIG ($Y_3Fe_5O_{12}$), those which use a deformable mirror, e.g., a DMD (Deformable Mirror Device), and so forth. In this embodiment, however, a reflective type liquid crystal spatial light modulator is used because it has relatively high resolution and high-speed response and it is easy to handle.

On the other hand, the reference beam device 7 is composed of the above-described reference beam 26 and a mirror 33. The mirror 33 is disposed in an appropriate position and at an appropriate angle so that the reference beam 26 is superimposed as an approximately parallel beam of desired angle on the Fourier transform information on the object of recognition, which is placed on the reflective type liquid crystal spatial light modulator 8. At this time, a computer, which serves as a control device 34, gives the liquid crystal spatial light modulator 8 a signal for bringing it into a write mode through a driver 35 therefor. Further, the control device 34 gives signals to shutters 36 and 37 through respective drivers 38 and 39 so that the shutter 36 is opened, while the shutter 37 is closed, thereby cutting off the read beam 29. Thus, the Fourier transform information on the object of recognition, which is carried by the write beam 28, is allowed to interfere with the reference beam 26 as an approximately parallel beam of desired angle, thereby recording a Fourier transform hologram which is the same as that represented by the expression (2) on the liquid crystal spatial light modulator 8 as a recording device. In this embodiment, the shutters 36 and 37 are those made of a liquid crystal material of the same type as that used in the liquid crystal spatial light modulator 8 in view of the readiness of control. However, it is also possible to use other types of shutter, for example, mechanical ones, if the operating speed may be somewhat sacrificed. It should be noted that a polarizer 13 is disposed in the optical path of the write and reference beams 28 and 26 between the shutter 36 and the reflective type liquid crystal spatial light modulator 8. The polarizer 13 is provided for the following reason. The write beam 28 that reflects from the mirror surface of the beam splitter 32 contains a large amount of s-polarized light component, while the reference beam 26 that passes through the beam splitter 32 contains a large amount of p-polarized light component. Accordingly, these two beams contain relatively small amounts of light components that interfere with each other. Therefore, the polarizer 13 is provided to enable the two polarized light components to interfere with each other in the direction of the transmission axis of the polarizer 13. Thus, the contrast of interference fringes can be increased by disposing the polarizer 13.

Next, the Fourier transform hologram formed on the reflective type liquid crystal spatial light modulator 8 is read by a read device 9. The read device 9 is arranged to apply the read beam 29 to the reflective type liquid crystal spatial light modulator 8 via a penta prism 40, which serves as an image correcting prism, and a beam splitter 41 so that the read beam 29 is incident on the liquid crystal spatial light modulator 8 in the opposite direction to the write beam 28.

The beam splitter 41 may be replaced with a polarized beam splitter. Alternatively, it may be replaced with an arrangement wherein a polarizer is disposed on the entrance side of an ordinary beam splitter 41 (i.e., on the exit side of the penta prism 40), and an analyzer is disposed on the exit side of the beam splitter 41 (i.e., on the entrance side of an inverse Fourier transform lens 10). With this arrangement, unnecessary light can be cut off, and the contrast of the output can be increased. It should be noted that the penta prism 40 is used for the purpose of correcting the Fourier transform information of the read beam 29 for the direction thereof, which is in inverse relation to the Fourier transform information of the write beam 28 (i.e., in inverse relation to the latter with regard to the direction in which an image is inverted by a mirror or other optical element). Thus, the use of the penta prism 40 enables the direction of the Fourier transform information of the write beam 28 and that of the read beam 29 to coincide with each other on the recording device 8. The arrangement may be such that the image correcting prism is replaced with a mirror, and an image correcting prism is disposed at the position of the mirror 30 or 31. In actual practice, the control device 34 further gives the reflective type liquid crystal spatial light modulator 8 a signal for bringing it into a read mode through the driver 35, and it also gives signals to the shutters 36 and 37 through the respective drivers 38 and 39 so that the shutter 36 is closed, while the shutter 37 is opened, thereby cutting off the information carried by the write and reference beams 28 and 26 and giving the reflective type liquid crystal spatial light modulator 8 only the Fourier transform information on the object of recognition which is carried by the read beam 28. Thus, the Fourier transform information on the object of recognition is read out. By this operation, information represented by the expression (3) is obtained.

Next, the read information is further subjected to inverse Fourier transform by using the inverse Fourier transform lens 10, thereby obtaining inverse Fourier transform information of the read information, that is, information represented by the expression (4), on a screen 42. The information thus obtained is further transmitted to and detected by a two-dimensional detector 43 serving as a detecting device 11 (a CCD camera, in this embodiment) through an imaging lens 44. For simplification, the detecting device for only a piece of information detected in one direction among pieces of information detected in three different directions is shown in FIG. 4. In the figure, the information represented by the expression (7) is observed in the direction (A); the information represented by the expression (6) is observed in the direction (C); and the information represented by the expression (5) is observed in the direction (B). Further, in this figure the angle of the reference beam 26 is exaggeratedly shown to be larger than the actual angle for the purpose of avoiding complication of the illustration, and therefore the arrangement is shown such that pieces of information in three different directions are obtained by using three sets of inverse Fourier transform devices and detecting devices. However, the actual angle of the reference beam is relatively small, and in many cases pieces of information in the three directions can be detected by one set of a detecting device and an inverse Fourier transform lens having a sufficiently large aperture to subject all the pieces of information in the three directions to inverse Fourier transform at a time.

Figure 5:
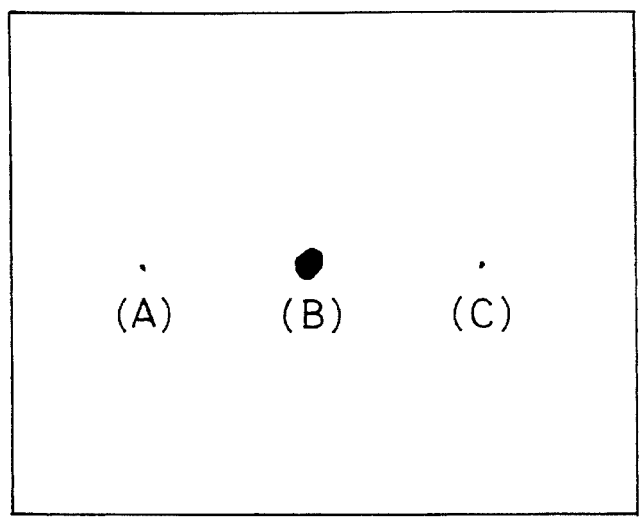
FIG. 5 shows an example of processing executed by the object position detecting apparatus according to the first embodiment of the present invention.

As one example, FIG. 5 shows the results of processing executed by the apparatus of this embodiment in which as an input object a circle with a diameter of 2.5 mm was input onto the optical axis (in this example also, detection was carried out using one set of an inverse Fourier transform lens and a detecting device). FIG. 5 shows a negative film containing the photographic record of pieces of information in three different directions obtained on the screen 42. In the figure, (A) shows information represented by the expression (7), obtained in the direction (A) in FIG. 4, and (B) shows information represented by the expression (5), obtained in the direction (B) in FIG. 4. Further, (C) shows information represented by the expression (6), obtained in the direction (C) in FIG. 4.

Next, we detected changes of the pieces of information represented by the expressions (5) to (7) when the object was shifted in one direction perpendicular to the optical axis. The results of the detection are shown in Table 1 and FIG. 6.

TABLE 1

| Amount of shift of input object from optical axis (mm) | Amount of shift of information represented by Exp. (7) (mm) | Amount of shift of information represented by Exp. (5) (mm) | Amount of shift of information represented by Exp. (6) (mm) |
| --- | --- | --- | --- |
| −5.0 | −9.65 | −5.60 | 0.00 |
| −4.0 | −8.17 | −4.50 | −0.19 |
| −3.0 | −5.79 | −3.02 | 0.00 |
| −2.0 | −4.05 | −1.93 | 0.00 |
| −1.0 | −1.93 | −1.09 | −0.19 |
| 0.0 | 0.00 | 0.00 | 0.00 |
| 1.0 | 2.12 | 0.64 | 0.00 |
| 2.0 | 4.25 | 1.93 | 0.00 |
| 3.0 | 5.79 | 2.57 | 0.00 |
| 4.0 | 8.56 | 3.86 | 0.19 |
| 5.0 | 10.75 | 5.15 | 0.00 |

Figure 6:
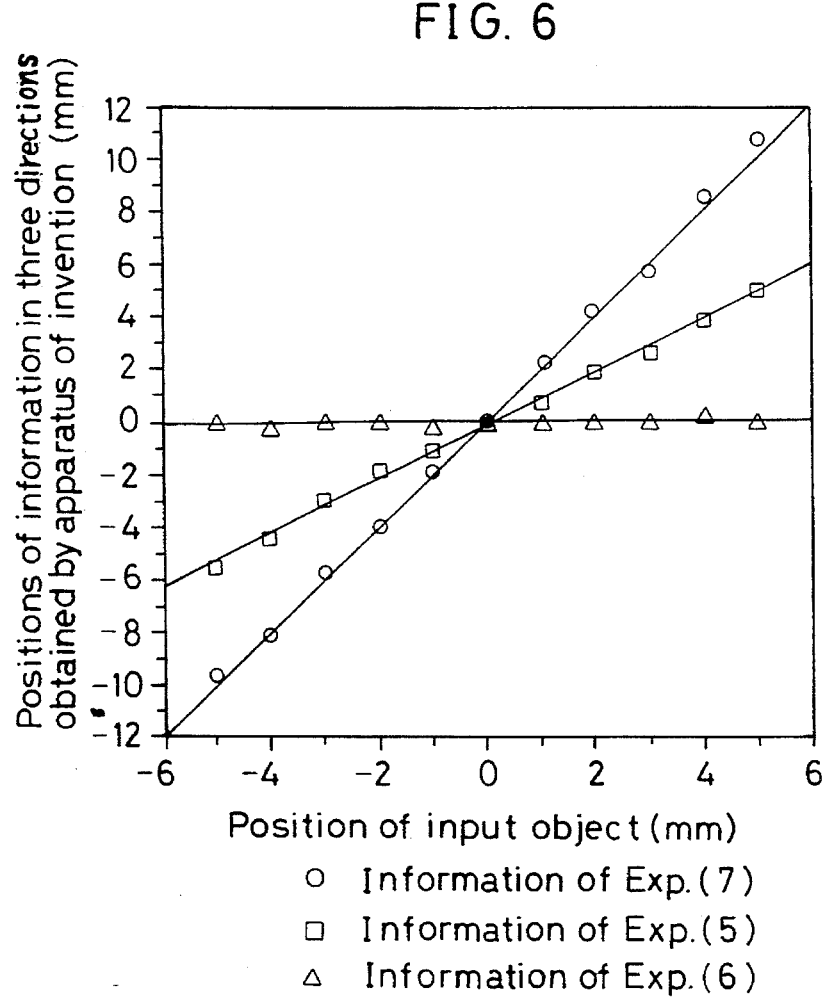
FIG. 6 is a graph showing changes of information with respect to the amount of shift of an object in the apparatus according to the first embodiment of the present invention.

The values in Table 1 were obtained by AD converting information detected by the CCD used as the detecting device 43, and inputting the converted information to a computer where a peak position of each piece of information obtained as the coordinates of a pixel of the CCD was converted into the original distance coordinates by calculation performed in the computer by taking into account the magnification (imaging magnification) and so forth related to processing executed during the detecting process. In FIG. 6, circles show changes of the information represented by the expression (7). When the results are fitted by the method of least squares, a straight line such as that shown by the solid line is obtained. The slope of this straight line is determined to be 2.04 by the fitting, which accords with the theory. Squares in FIG. 6 show changes of the information represented by the expression (5). When the results are fitted by the method of least squares, a straight line such as that shown by the solid line is obtained. The slope of this straight line is determined to be 1.03 by the fitting, which also accords with the theory. Triangles in FIG. 6 show changes of the information represented by the expression (6). When the results are fitted by the method of least squares, a straight line such as that shown by the solid line is obtained. The slope of this straight line is determined to be 0 by the fitting, which accords with the theory. Although in this embodiment the input object is moved in only one direction for the sake of simplicity, it should be noted that information can be similarly detected even in a case where the object has shifted in another direction or in both directions, as a matter of course.

It will be understood from the foregoing description that the apparatus shown in this embodiment enables the position of the object of recognition to be obtained as a value which is exactly a half of the peak position of the information represented by the expression (7) and also obtained as the same position as the peak position of the information represented by the expression (5), and that the method the present invention is capable of detecting the object position in accordance with the theory.

In this embodiment, identical lenses of equal focal length are used for the Fourier transform lens 6 and the inverse Fourier transform lens 10, and the optical path length from the image input device 5 to the Fourier transform lens 6, the optical path length from the Fourier transform lens 6 to the spatial light modulator 8, the optical path length from the spatial light modulator 8 to the inverse Fourier transform lens 10, and the optical path length from the inverse Fourier transform lens 10 to the screen 42 are determined in conformity to the focal length of the lenses 6 and 10. However, it will be apparent that the Fourier transform lens 6 and the inverse Fourier transform lens 10 may have different focal lengths, and in such a case, the object position to be detected should be multiplied by a coefficient in accordance with the difference between the focal lengths.

Although in this embodiment the optical path length between the image input device 5 and the Fourier transform lens 6 is determined so that information on the phase of the object can also be handled, if the object phase information is not handled, the optical path length from the image input device 5 to the Fourier transform lens 6 may be shortened to thereby make the system compact.

Second Embodiment

Figure 7:
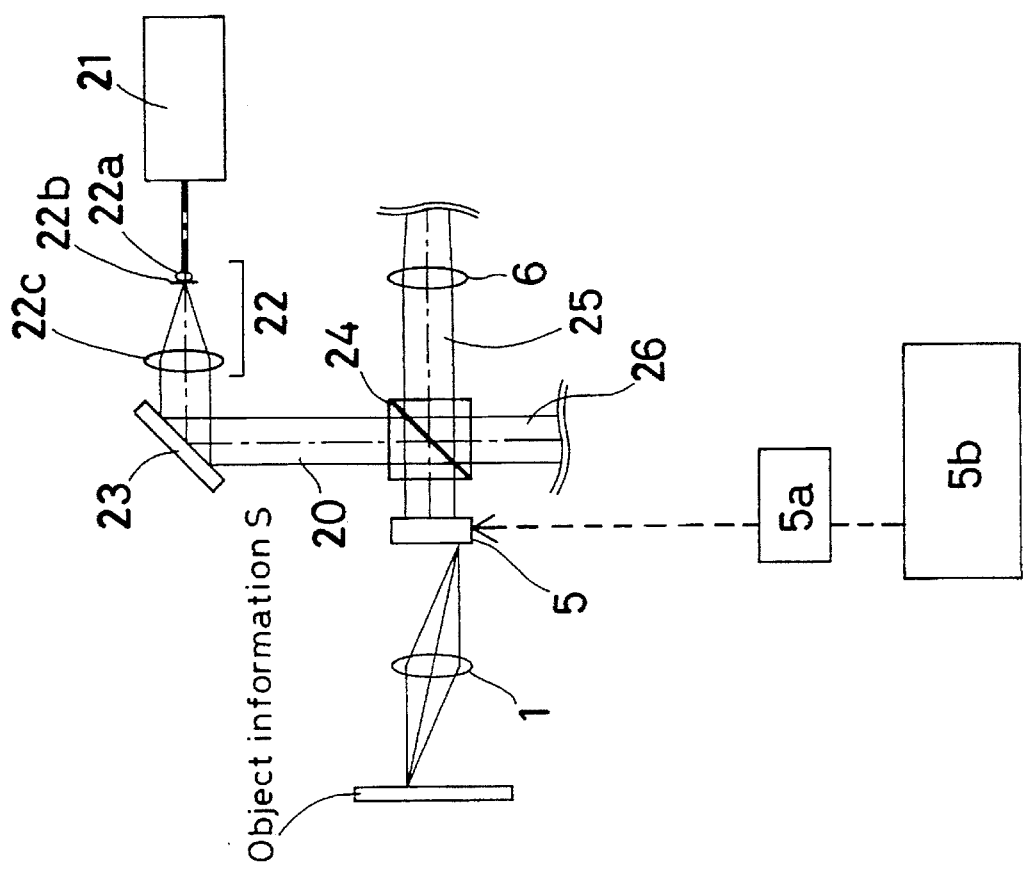
FIG. 7 shows an essential part of an optical system of an object position detecting apparatus according to a second embodiment of the present invention.

FIG. 7 shows the optical system of an essential part of a second embodiment. This embodiment is a modification of the first embodiment. In this embodiment, the image input device 5 in the first embodiment is changed to an optically addressed reflective type spatial light modulator. The arrangement and function of the rest of the second embodiment is the same as the first embodiment.

As the optically addressed reflective type spatial light modulator, it is possible to use the same type of device as that usable for the recording device 8 in the first embodiment. Accordingly, in this embodiment also, a reflective type liquid crystal spatial light modulator is used as the image input device 5. An image of object information S to be recognized is formed directly on the reflective type liquid crystal spatial light modulator 5 by an imaging lens serving as an imaging device 1. The information is recorded by giving the liquid crystal spatial light modulator 5 a signal for bringing it into a write mode through a driver 5a for the light modulator 5 under the control of a computer serving as a control device 5b. Further, the liquid crystal spatial light modulator 5 is given a signal for bringing it into a read mode through the driver 5a therefore, and an approximately parallel beam of light 20, which is generated by a coherent light source 21 and a beam expander 22 similar to those in the first embodiment, is bent by a mirror 23 and a beam splitter 24 so as to enter the liquid crystal spatial light modulator 5, thereby reading the information in the form of reflected light from the light modulator 5. The read information is then applied as a write-read beam 25 to a Fourier transform device 6 where it is subjected to Fourier transform. On the other hand, a part of the beam 20 that passes through the beam splitter 24 is sent as a reference beam 26 to the reference beam device 7. The arrangement and function of the rest of this embodiment are the same as those in the first embodiment. It will be clear that the position of the object of recognition can be detected in the same way as in the first embodiment.

In this embodiment also, the beam splitter 24 may be replaced with a polarized beam splitter. Alternatively, it may be replaced with an arrangement wherein a polarizer is disposed on the entrance side of an ordinary beam splitter 24 (i.e., on the exit side of the mirror 23), and an analyzer is disposed on the exit side of the beam splitter 24 (i.e., on the entrance side of the Fourier transform lens 6). With this arrangement, unnecessary light can be cut off, and the contrast of the output can be increased.

Although an optically addressed reflective type spatial light modulator is used in the second embodiment, it will be apparent that even if an optically addressed transmissive type spatial light modulator is used, the apparatus can be arranged in substantially the same way as the above.

Third Embodiment

This embodiment also shows an object position detecting apparatus for realizing the object position detecting method of the present invention in the same way as in the first embodiment. Thus, the basic arrangement and function of this embodiment are the same as those of the first embodiment except for alterations made on the optical system to use a transmissive type spatial light modulator.

Figure 8:
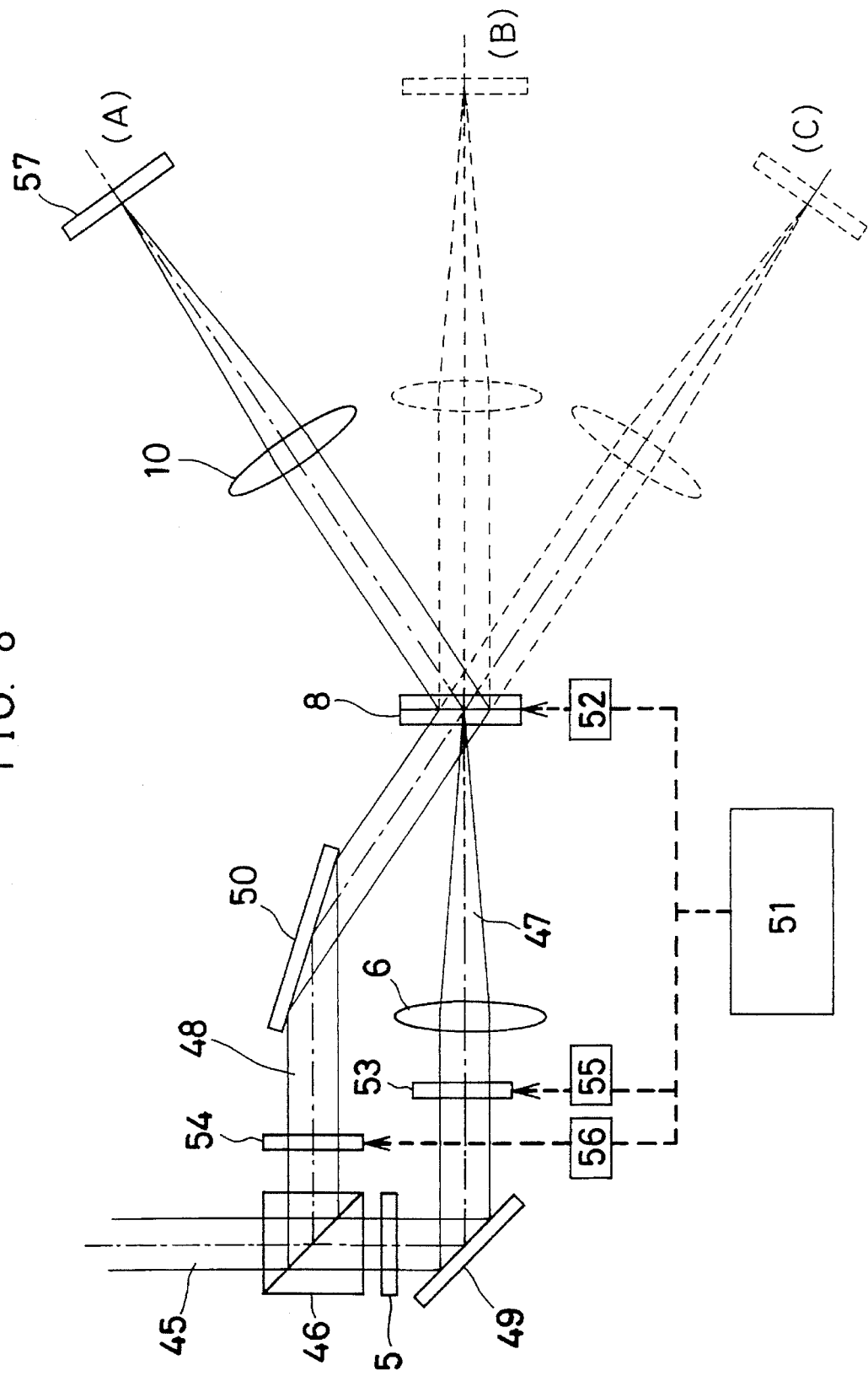
FIG. 8 shows an optical system of an object position detecting apparatus according to a third embodiment of the present invention.

The third embodiment will be explained below with reference to FIG. 8, which shows the optical system of this embodiment. First, an approximately parallel beam of light 45 is generated by a coherent light source (not shown) and a beam expander (not shown) which are similar to those in the first embodiment. The parallel beam 45 is split into two beams, that is, a write-read beam 47 and a reference beam 48, by a beam splitter 46. Information on an object to be recognized, which is taken by an imaging device 1 (not shown) similar to that in the first embodiment, is input to the write-read beam 47 by displaying the information on an electrically addressed spatial light modulator, e.g., a liquid crystal spatial light modulator, which serves as an image input device 5. The write-read beam 47 having the object information superimposed thereon is reflected from a mirror 49 and passed through a Fourier transform lens serving as a Fourier transform device 6. Thus, Fourier transform information on the object of recognition is placed on a transmissive type spatial light modulator serving as a recording device 8. Examples of transmissive type spatial light modulators usable as the recording device 8 include those which use a photorefractive crystal, e.g., BSO ($Bi_{12}SiO_{20}$), those which use a ferroelectric liquid crystal, or TN (Twisted Nematic) liquid crystal, those which use an etalon type transmissive type spatial light modulator that uses a semiconductor having a MQW (Multiple Quantum Wells) structure, e.g., Seed (Self Electro-Optic Device), or a bulk structure, e.g., ZnS. In this embodiment, however, a transmissive type liquid crystal spatial light modulator is used because it has relatively high resolution and high-speed response and it is easy to handle.

On the other hand, the reference beam device 7 is composed of the above-described reference beam 48 and a mirror 50. The mirror 50 is disposed in an appropriate position and at an appropriate angle so that the reference beam 48 is superimposed as an approximately parallel beam of desired angle on the Fourier transform information on the object of recognition, which is placed on the transmissive type liquid crystal spatial light modulator 8. At this time, a computer, which serves as a control device 51, gives the transmissive type liquid crystal spatial light modulator 8 a signal for bringing it into a write mode through a driver 52 for the light modulator 8. Further, the control device 51 gives signals to shutters 53 and 54 through respective drivers 55 and 56 so that the shutters 53 and 54 are opened. Thus, the Fourier transform information on the object of recognition, which is carried by the write-read beam 47, is allowed to interfere with the reference beam 48 as an approximately parallel beam of desired angle, thereby recording a Fourier transform hologram which is the same as that represented by the expression (2) on the transmissive type liquid crystal spatial light modulator 8. In this embodiment, the shutters 55 and 56 are those made of a liquid crystal material of the same type as that used in the liquid crystal spatial light modulator 8 in view of the readiness of control, in the same way as in the first embodiment. However, it is also possible to use other types of shutter, for example, mechanical ones, if the operating speed may be somewhat sacrificed.

Next, the Fourier transform hologram formed on the transmissive type liquid crystal spatial light modulator 8 is read by a read device 9. In this embodiment, the read device 9 uses the write-read beam 47 as it is. The control device 51 gives the transmissive type liquid crystal spatial light modulator 8 a signal for bringing it into a read mode through the driver 52, and it also gives signals to the shutters 54 and 53 through the respective drivers 56 and 55 so that the shutter 54 is closed, while the shutter 53 is opened, thereby cutting off the information carried by the reference beam 48 and giving the transmissive type liquid crystal spatial light modulator 8 only the Fourier transform information on the object of recognition which is carried by the write-read beam 47. Thus, the Fourier transform information on the object of recognition is read out. By this operation, information represented by the expression (3) is obtained.

Next, the read information is further subjected to inverse Fourier transform by using an inverse Fourier transform lens as an inverse Fourier transform device 10, thereby obtaining inverse Fourier transform information of the read information, that is, information represented by the expression (4), on a screen 57. The information is further detected by a detecting device 11 (not shown) similar to that in the first embodiment. In the figure, the information represented by the expression (7) is observed in the direction (A); the information represented by the expression (6) is observed in the direction (C); and the information represented by the expression (5) is observed in the direction (B).

In this figure also, the angle of the reference beam 48 is exaggeratedly shown to be larger than the actual angle for the purpose of avoiding complication of the illustration in the same way as in the first embodiment, and therefore the arrangement is shown such that pieces of information in three different directions are obtained by using three sets of inverse Fourier transform devices and detecting devices. However, the actual angle of the reference beam 48 is relatively small, and in many cases pieces of information in the three directions can be detected by one set of a detecting device and an inverse Fourier transform lens having a sufficiently large aperture to subject all the pieces of information in the three directions to inverse Fourier transform at a time. In addition, there are cases where it is preferable to tilt the beam splitter 46 in place of the mirror 50 used as the reference beam device 7, thereby superimposing the reference beam 48 as an approximately parallel beam of desired angle on the Fourier transform information.

Specific examples of processing are omitted in this embodiment. However, it will be apparent from consideration of the foregoing contents and the results of the first embodiment that the method of the present invention is capable of detecting the object position in accordance with the theory.

In this embodiment also, identical lenses of equal focal length are used for the Fourier transform lens 6 and the inverse Fourier transform lens 10, and the optical path length from the image input device 5 to the Fourier transform lens 6, the optical path length from the Fourier transform lens 6 to the spatial light modulator 8, the optical path length from the spatial light modulator 8 to the inverse Fourier transform lens 10, and the optical path length from the inverse Fourier transform lens 10 to the screen 57 are determined in conformity to the focal length of the lenses 6 and 10 in the same way as in the first embodiment. However, it will be apparent that the Fourier transform lens 6 and the inverse Fourier transform lens 10 may have different focal lengths, and in such a case, the object position to be detected should be multiplied by a coefficient in accordance with the difference between the focal lengths.

Although in this embodiment the optical path length between the image input device 5 and the Fourier transform lens 6 is determined so that information on the phase of the object can also be handled, if the object phase information is not handled, the optical path length from the image input device 5 to the Fourier transform lens 6 may be shortened to thereby make the system compact.

Fourth Embodiment

This embodiment realizes an apparatus for obtaining a convolution image represented by the expression (7) in the above-described object position detecting method by using a computer and other associated devices.

Figure 3:
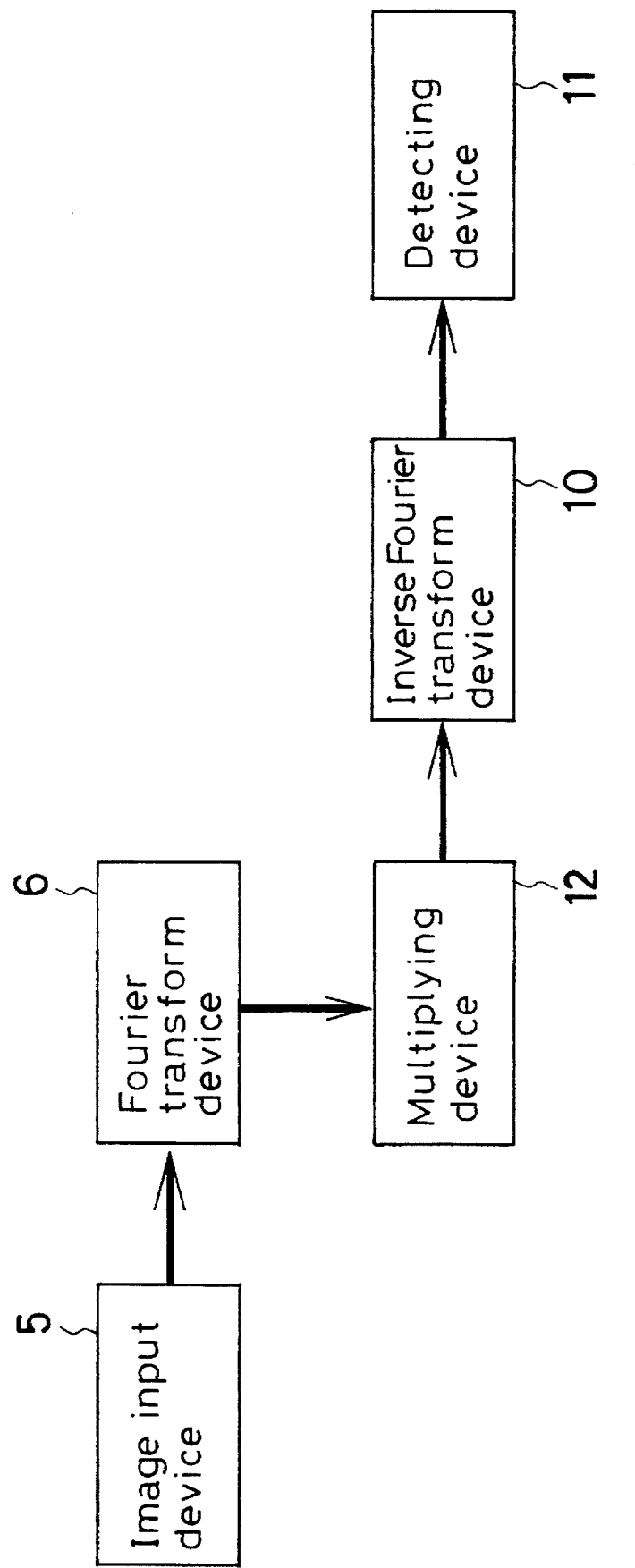
FIG. 3 is a block diagram showing the arrangement of another object position detecting apparatus according to the present invention.

Referring to FIG. 3, information on an object to be recognized is input to a frame memory serving as an image input device 5 by an imaging device 1, e.g., CCD (not shown). In the image input device 5, the information is AD converted. The AD converted object information is sent to an FFT processor in a computer serving as a Fourier transform device 6, where it is subjected to Fourier transform. Then, the information is stored in a memory built in the computer. Further, the information, which has been Fourier-transformed and stored in the memory, is read out from the memory by a multiplying device 12 whereby the information is squared for each pixel on the computer. Then, the information is stored in the memory again. The information squared for each pixel is sent to an FFT processor in the computer serving as an inverse Fourier transform device 10, where it is subjected to inverse Fourier transform to obtain convolution information, which is then stored in the memory of the computer. Finally, the convolution information is read out by a detecting device 11 where coordinates of a peak position of the information is detected. Then, a position whose coordinates are half the detected coordinates is located, and the coordinates of this position are output as the coordinates of the object position.

Figure 9:
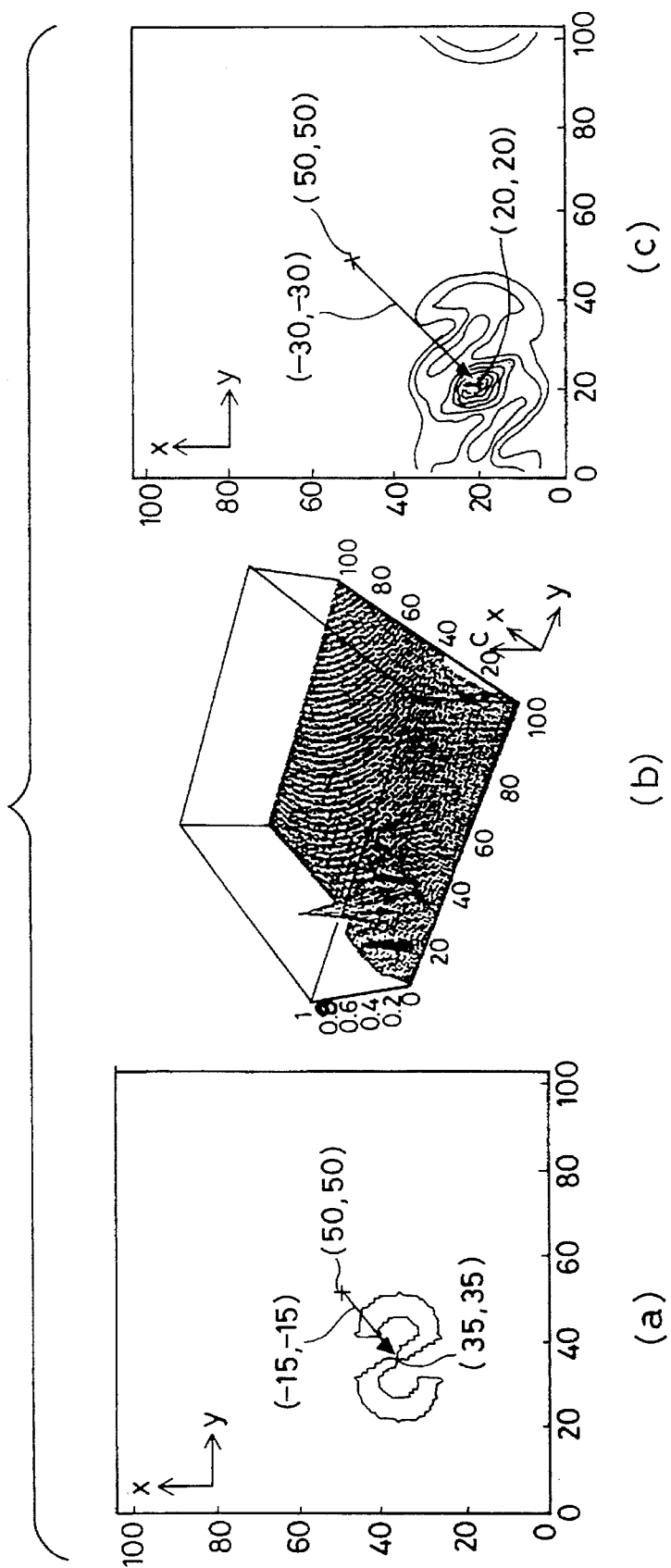
FIG. 9 shows an example of processing executed by an object position detecting apparatus according to a fourth embodiment of the present invention.
Figure 10:
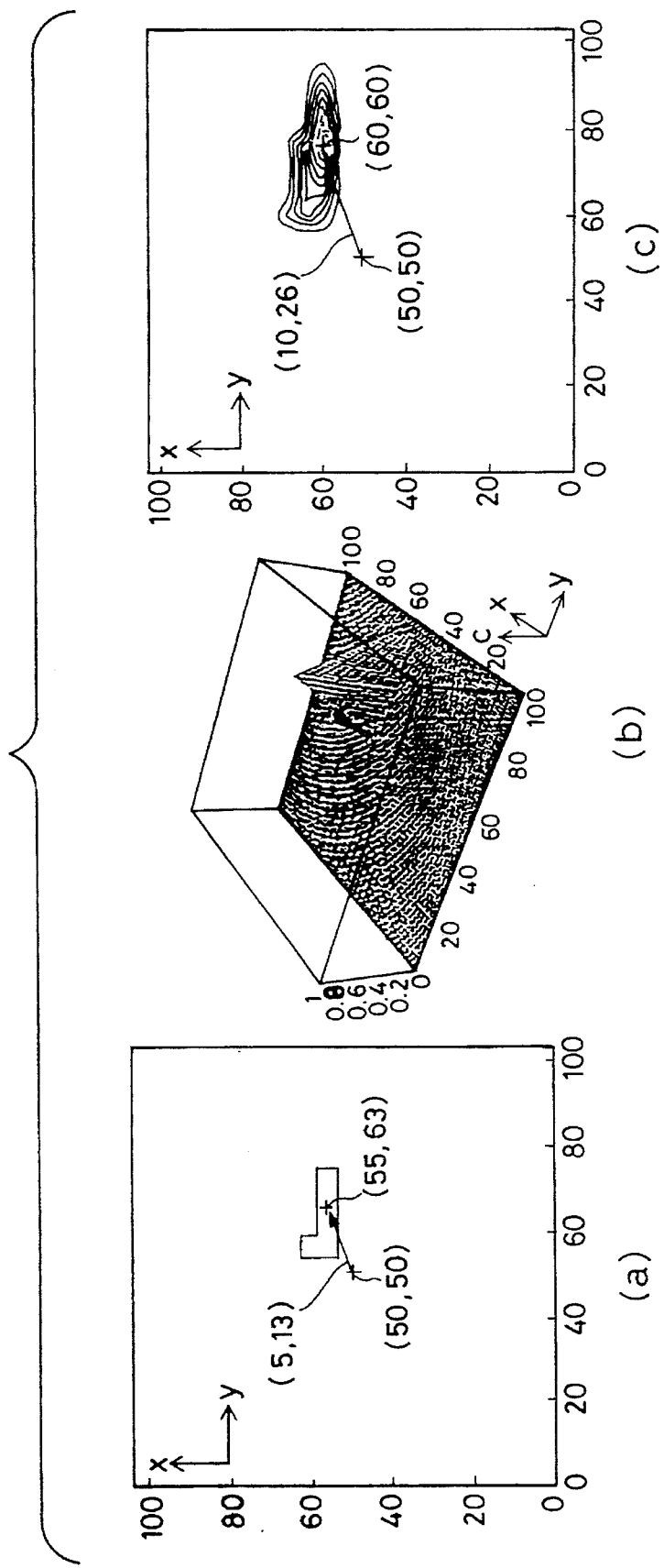
FIG. 10 shows another example of processing executed by the object position detecting apparatus according to the fourth embodiment of the present invention.

Next, specific examples of processing for obtaining a convolution image by the object position detecting apparatus will be shown with reference to FIGS. 9 and 10. FIG. 9 shows the results of an example in which an image of a letter S is taken into the apparatus, as shown in FIG. 9(a), and AD converted in the form of information represented by 100× 100 pixels in the frame memory and then subjected to the processing. The letter S shown in FIG. 9(a) is information lying at coordinates (35, 35) as a result of shift from the origin (optical axis) at coordinates (50, 50) by (−15, −15). A convolution image obtained on the basis of the results of the processing is shown in the bird's-eye view of FIG. 9(b), and a contour map thereof is shown in FIG. 9(c). The height c in FIG. 9(b) represents the normalized convolution value. As shown in FIGS. 9(b) and 9(c), the peak position of the convolution image is at coordinates (20, 20). Thus, the amount of shift of the peak position is (−30, −30) from the origin. Accordingly, exactly a half of the amount of shift is coincident with the vector indicating the position of the input image. Similarly, a letter L which has been AD converted in the form of information represented by 100× 100 pixels, shown in FIG. 10(a), lies at coordinates (55, 63) as a result of shift from the origin (optical axis) at coordinates (50, 50) by (5, 13). A convolution image obtained on the basis of the results of the processing is shown in the bird's-eye view of FIG. 10(b), and a contour map thereof is shown in FIG. 10(c). As shown in FIGS. 10(b) and 10(c), the peak position of the convolution image is at coordinates (60, 76). Since the amount of shift of the peak position is (10, 26) from the origin, exactly a half of the amount of shift is coincident with the vector indicating the position of the input image.

It will be clear from the above results that the apparatus of this embodiment is capable of obtaining convolution information on an object to be recognized and also capable of obtaining the position of the object of recognition, and that the above-described object position detecting method is valid not only in theory but also in practice.

Fifth Embodiment

The following is a description of an image processing system that performs recognition of an object by using an object position detecting apparatus for realizing the object position detecting method as shown in the first to fourth embodiments.

Figure 1:
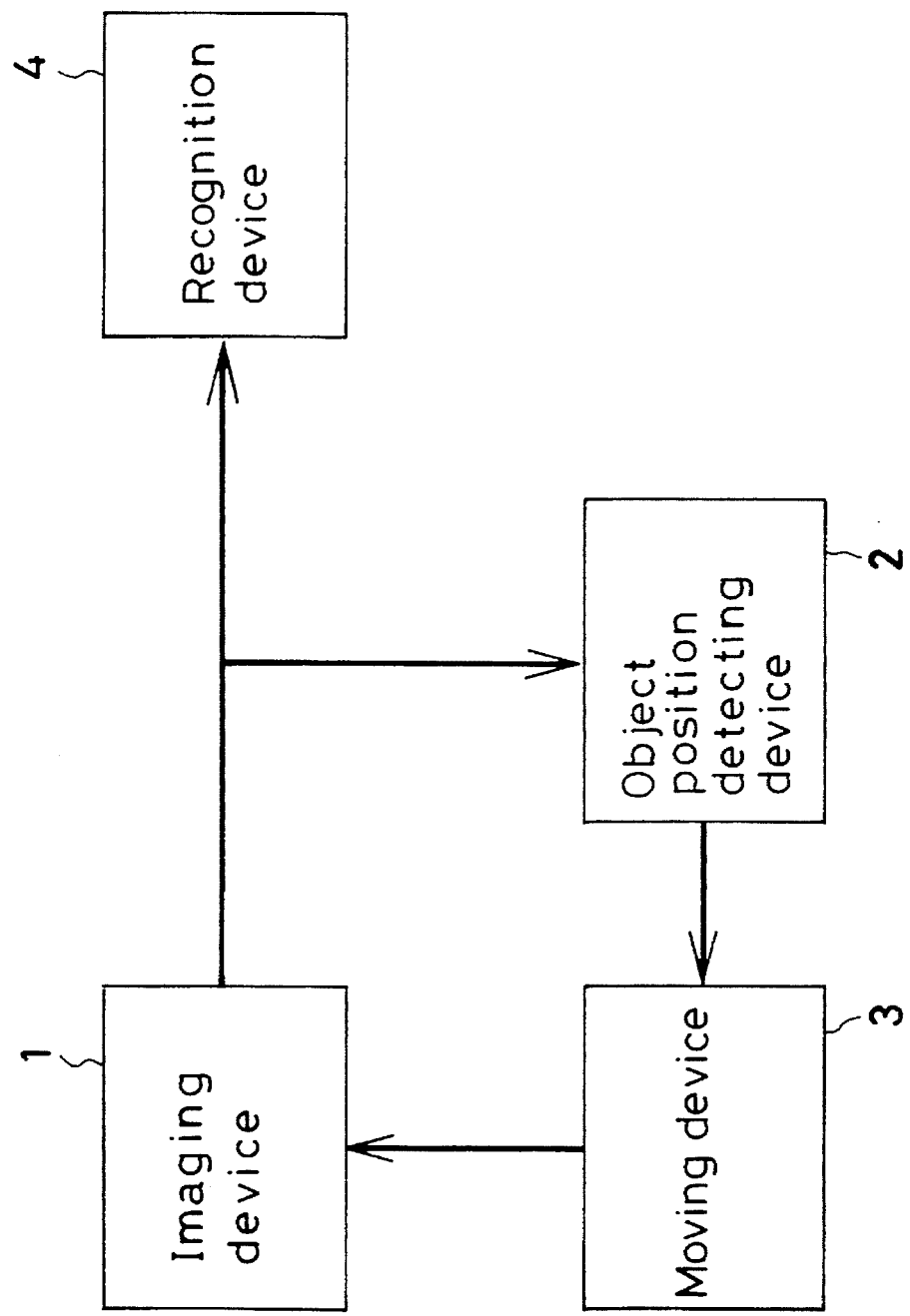
FIG. 1 is a block diagram showing the arrangement of an image processing system according to the present invention.
Figure 2:
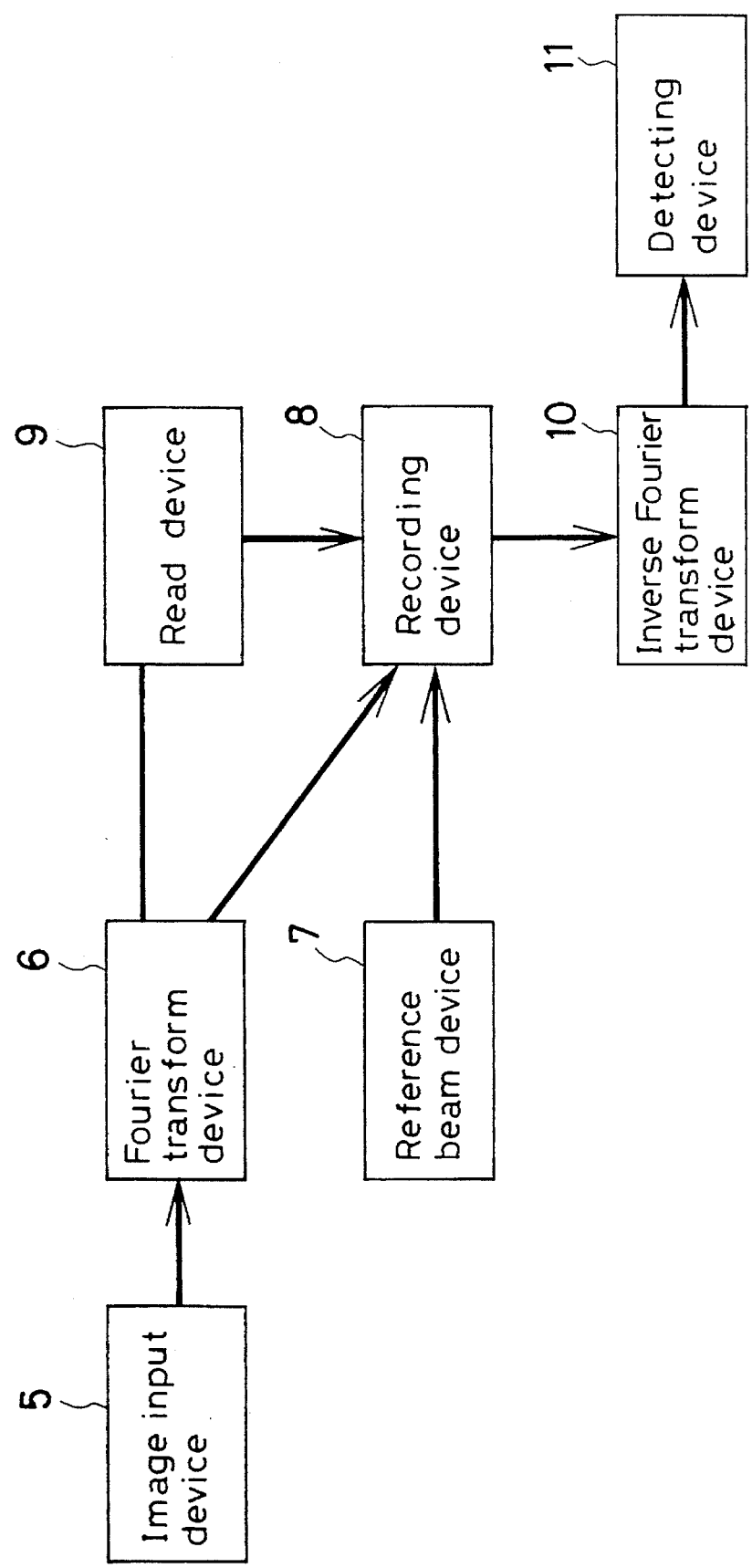
FIG. 2 is a block diagram showing the arrangement of an object position detecting apparatus according to the present invention.
Figure 11:
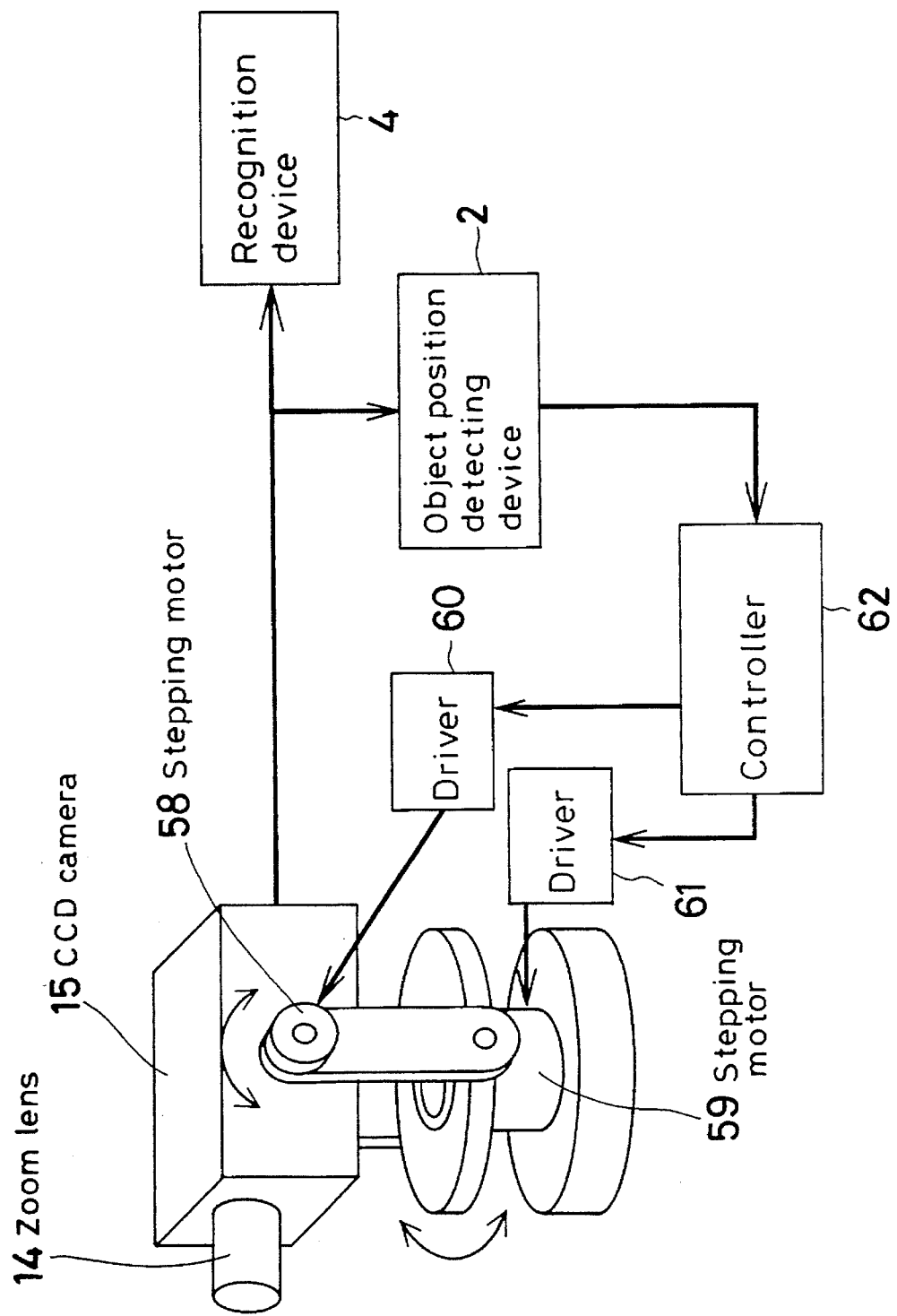
FIG. 11 shows the arrangement of an image processing system according to a fifth embodiment of the present invention.

The system of this embodiment is arranged as has already been explained with reference to FIG. 1. The arrangement of the system will be described below more specifically with reference to FIG. 11. An image of an object of recognition is taken by using, for example, a CCD camera 15 equipped with a zoom lens 14 as an imaging device 1. The object image is then taken into an object position detecting device 2 by an image input device 5 (not shown), and processed by an apparatus such as those shown in the first to fourth embodiments, thereby obtaining information on the position of the object. Then, the object position information is sent to a moving device 3.

The moving device 3 is composed of stepping motors 58 and 59, which are attached to the CCD camera 15 (the imaging device 1) to constitute a swing & tilt mechanism for moving object information onto the optical axis, drivers 60 and 61 for activating the stepping motors 58 and 59, and a controller 62 that calculates appropriate amounts of movement for the stepping motors 58 and 59 from the position information sent from the object position detecting device 2 and that gives the drivers 60 and 61 information for moving the stepping motors 58 and 59 by the amounts calculated (it should be noted that the term "position information" used herein means information obtained by halving the information of the expression (7) sent from the object position detecting device 2, or the information of the expression (5), or a combination of these pieces of information, and that the origin should previously be calibrated for a case where the object lies on the optical axis. These pieces of information may be considered in positional relation to the information of the expression (6)).

With the above-described arrangement, it is possible to detect the position (amount and direction of shift from the optical axis) of an input object to be recognized, move the imaging device on the basis of the position information so that the information on the object of recognition is moved onto the optical axis, and send the object information moved onto the optical axis to a recognition device 4. In other words, no matter where on the input screen the object is located, the identical object information can be sent to the recognition device 4. Accordingly, it is possible to realize an improvement in generalizability related to shift deformation without a deficiency of information.

Figure 14:
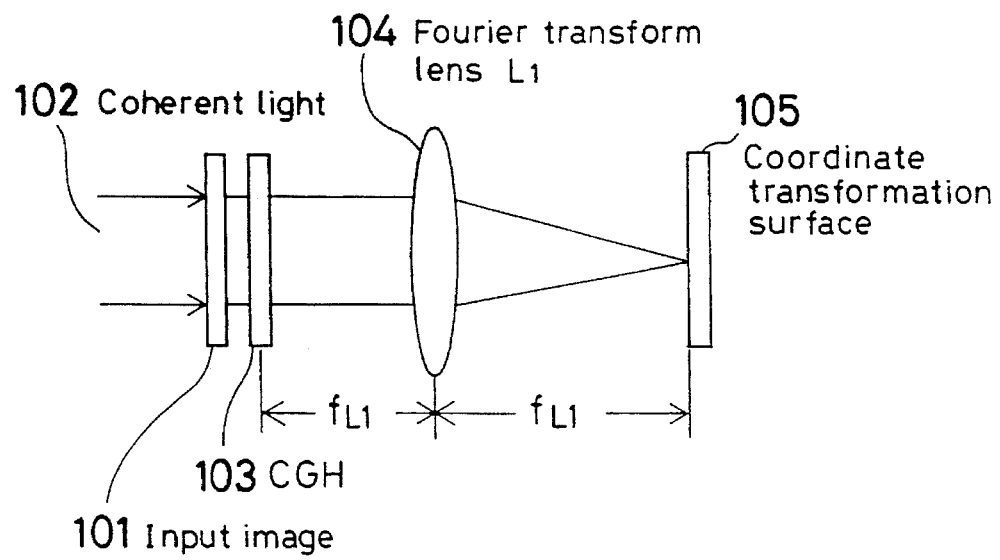
FIG. 14 shows a conventional logarithmic polar coordinate transformation optical system.

The recognition device 4 will be explained below with reference to FIG. 12. The optical system shown in the upper half of the figure is a coordinate transformation optical system that performs logarithmic polar coordinate transformation of an input image by the same arrangement as that of the prior art shown in FIG. 14. An image of an object to be recognized is taken by the CCD camera (the imaging device 1) positioned on the optical axis by the above-described apparatus and mechanism, and the object image is sent from the CCD camera so as to be input to an image input device 63, which is a transmissive type spatial light modulator, e.g., a liquid crystal transmissive type spatial light modulator, disposed on an input surface. The input image on the image input device 63 is illuminated by an approximately parallel beam of coherent light 64 generated by a device similar to that in the first embodiment. Further, phase information for coordinate transformation is superimposed on the image information by a CGH 65. Then, the resulting information is Fourier-transformed by a Fourier transform lens 66 to output coordinate transformation information on a coordinate transformation surface 67 disposed on the back focal surface of the Fourier transform lens 66. The coordinate transformation information is detected by a detecting device 69, e.g., a CCD.

Figure 12:
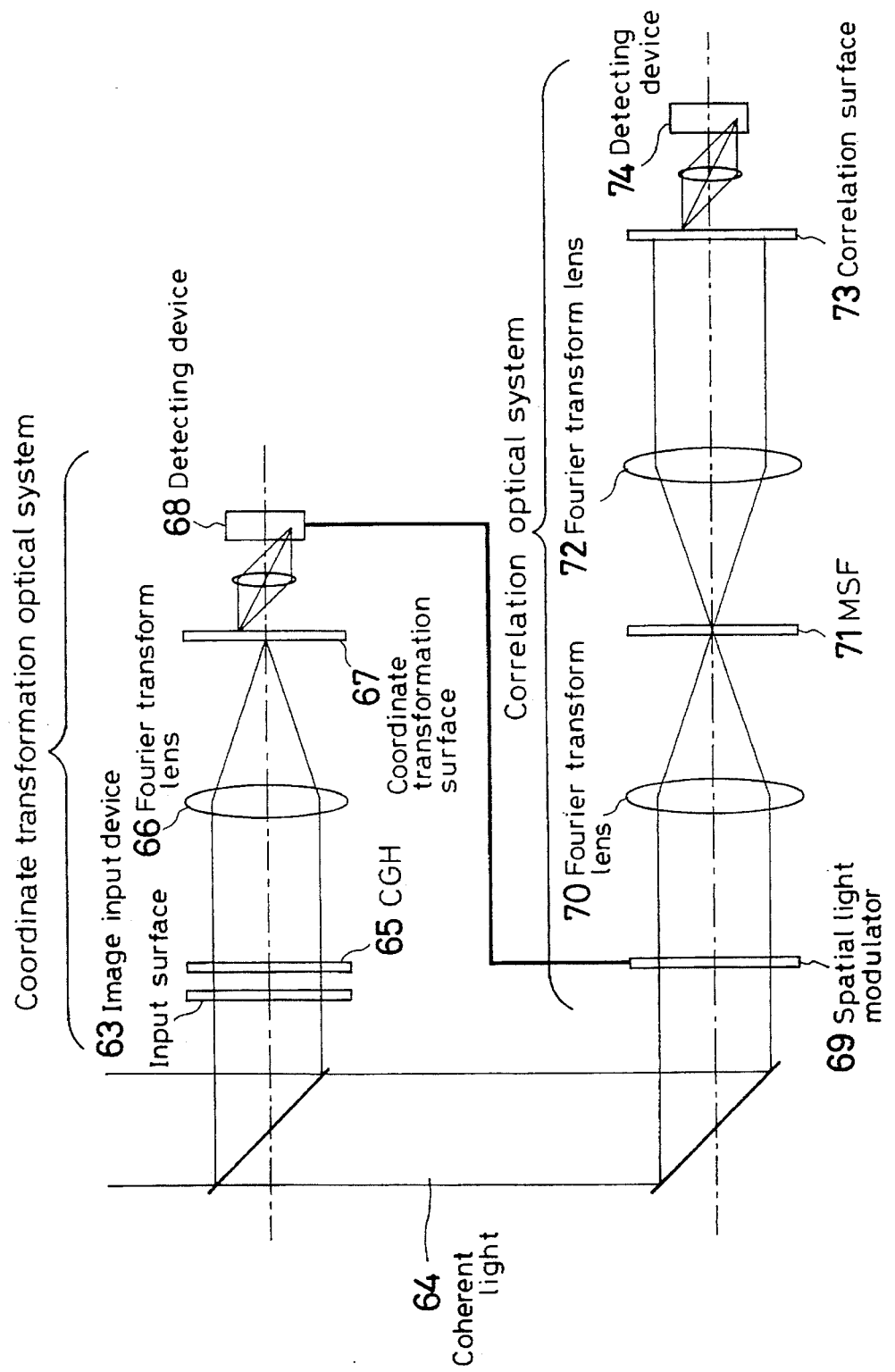
FIG. 12 shows an optical system of a recognition device in the fifth embodiment of the present invention.
Figure 15:
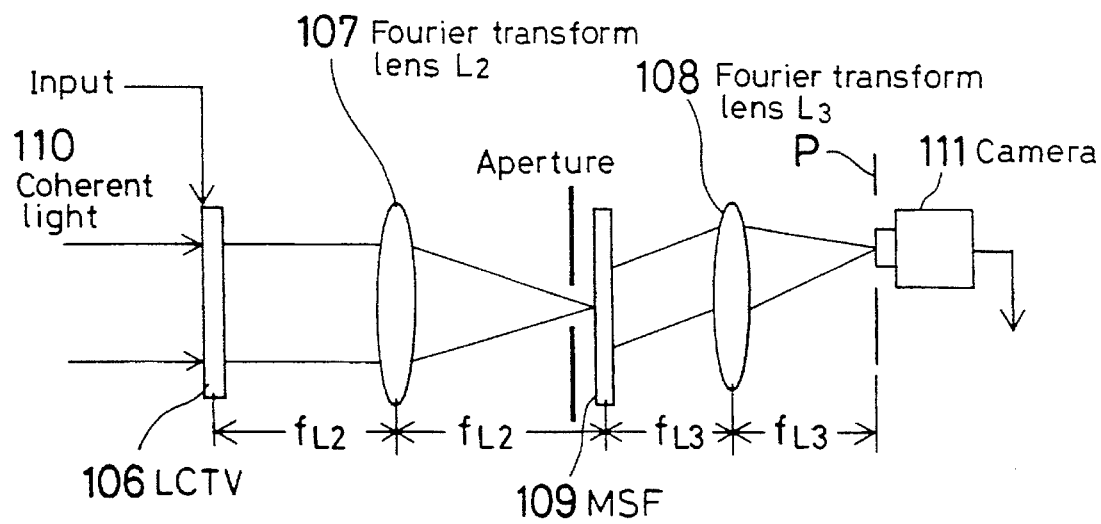
FIG. 15 shows a conventional correlation optical system.

The detected information is further input to a correlation optical system shown in the lower half of FIG. 12, which has the same arrangement as that of the prior art shown in FIG. 15, through a transmissive type spatial light modulator 69, e.g., a liquid crystal transmissive type spatial light modulator. The correlation optical system is composed of the transmissive type spatial light modulator 69 for writing the coordinate transformation information into the system, the approximately parallel beam of coherent light 64, a Fourier transform lens 70 for Fourier-transforming the coordinate transformation information inputted to the system by the transmissive type spatial light modulator 69 and the coherent light beam 64, an MSF 71 disposed on the back focal point of the Fourier transform lens 70 to superimpose reference image information for recognition, another Fourier transform lens 72 for Fourier-transforming the information having the reference image information superimposed thereon, and a detecting device 74, e.g., a CCD, which is disposed on the back focal point of the second Fourier transform lens 72 to detect a correlation peak outputted onto a correlation surface 73. In the recognition device 4, the coordinate transformation optical system shown in the upper half of the figure transforms rotation and scaling deformation of the input image into an amount of shift, and the correlation optical system shown in the lower half of the figure performs shift invariant correlation processing, as has been stated in the description of the prior art. Accordingly, it will be understood that the recognition device 4 can perform recognition independently of rotation and scaling deformation.

It should be noted that the MSF 71 for an object image used as a reference for recognition is formed as follows: With a hologram dry plate placed at the position of the MSF 71, an image of an object to be recognized is input onto the optical axis by the imaging device 1. After a series of processing steps described above, information on the object of recognition which is to be formed on the surface of the hologram dry plate is subjected to coordinate transformation and further Fourier-transformed. Then, the information is allowed to interfere with reference light angled so that a desired spatial frequency is obtained, thereby recording reference image information.

It will be understood from the foregoing description that the image processing system of this embodiment is capable of highly accurately recognizing even an image subjected to deformation such as shift, rotation or scaling.

It is a matter of course that an image processing system similar to the above can be constructed by using a JTC (Joint Transform Correlator) or the like as the correlation system.

Sixth Embodiment

Figure 13:
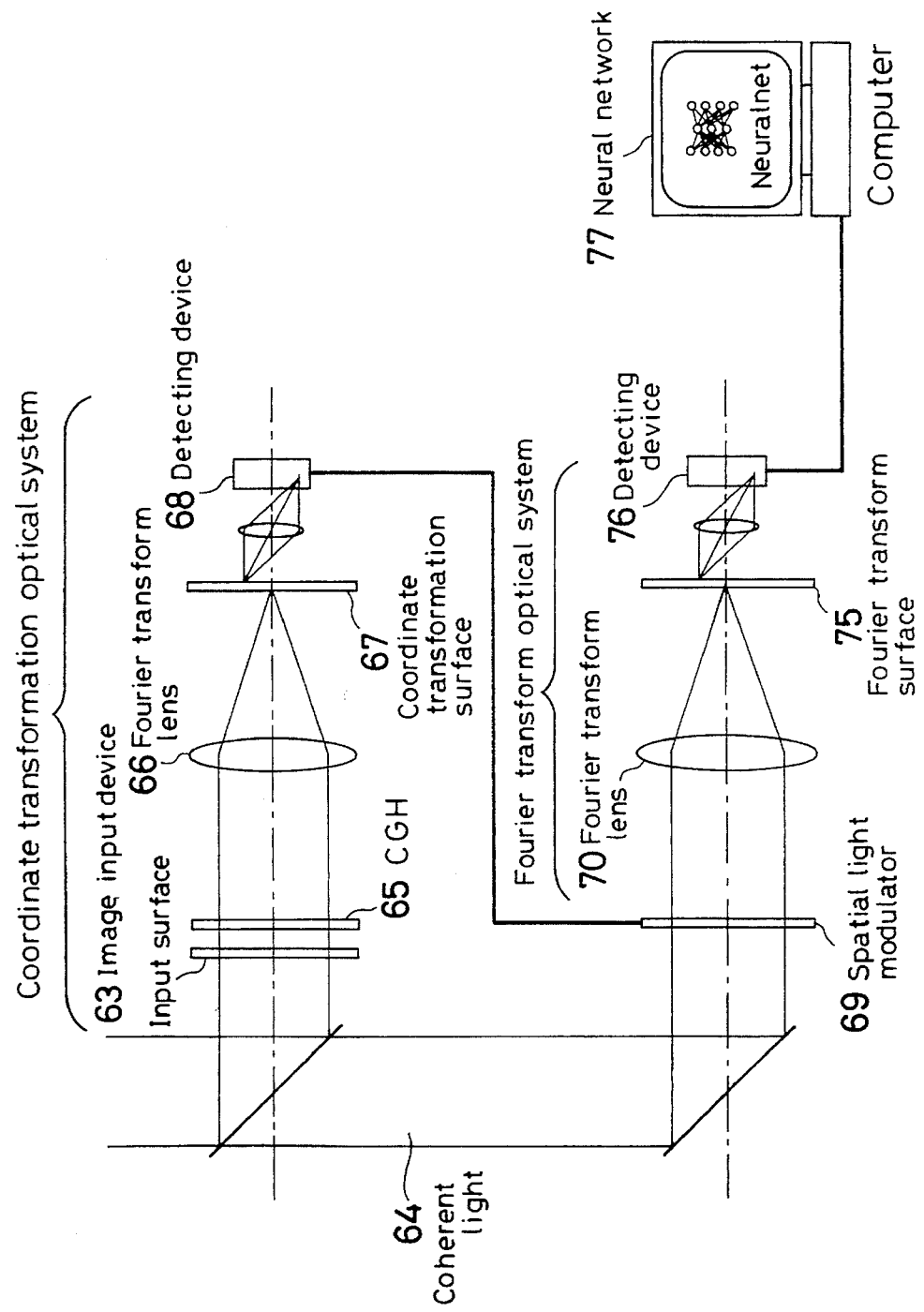
FIG. 13 shows an optical system of a recognition device in a sixth embodiment of the present invention.

This embodiment is a modification of the fifth embodiment, which is an image processing system that performs recognition (pattern classification) of an input image in real time by using an optical system shown in FIG. 13 as a recognition device 4. This embodiment is composed of the same constituent elements as those in the fifth embodiment except for the optical system shown in the lower half of FIG. 13. The lower half of the optical system shown in the figure includes a Fourier transform optical system for Fourier-transforming the information transformed in the coordinate transformation optical system and for sending the Fourier-transformed information to a neural network in the following stage. The neural network performs recognition by using the Fourier-transformed information. The Fourier transform optical system is composed of a spatial light modulator 69, e.g., a liquid crystal spatial light modulator, for inputting to the system the coordinate transformation information transformed in the coordinate transformation optical system, an approximately parallel beam of coherent light 64, a Fourier transform lens 70 for Fourier-transforming the coordinate transformation information inputted to the system by the combination of the spatial light modulator 69 and the coherent light beam 64, and a detecting device 76, e.g., a CCD, for detecting information outputted to a Fourier transform surface 75 disposed on the back focal point of the Fourier transform lens 70 and for sampling the information at an appropriate interval and sending it to a neural network 77 constructed on a computer. The Fourier transform optical system is a shift invariant optical system. Therefore, even if the input image is deformed, the deformation is transformed into an amount of shift by the coordinate transformation optical system. Accordingly, it will be understood that even if the image is subjected to deformation, information identical with the original image can be obtained on the Fourier transform surface 75, and the information having been subjected to the processing has been transformed into information insensitive to deformation. Let us consider a back propagation model, for example, as the neural network 77. First, it is necessary to determine a synaptic weight between each pair of adjacent layers of the neural network 77 by learning. That is, as images to be subjected to recognition (pattern classification) are sequentially input onto the optical axis by the imaging device 1, Fourier transform images, which are obtained by Fourier-transforming coordinate transformation information on the input images, are sequentially input to the neurons in the input layer of the neural network 77. Therefore, a synaptic weight between each pair of adjacent layers should be determined by using the back propagation learning rule so that when the Fourier transform images are sequentially input to the neurons in the input layer of the neural network 77, firing of the neurons in the output layer of the neural network 77 is selectively performed in correspondence to the images to be subjected to recognition (pattern classification). To effect recognition (pattern classification), with the synaptic weight between each pair of adjacent layers fixed, an image to be subjected to recognition (pattern classification) is presented on the input surface by the image input device 1, and firing of the neurons in the output layer is detected.

It will be apparent that the above-described arrangement makes it possible to realize not only pattern classifying capability of the ordinary neural network 77 but also a considerable improvement in generalizability whereby even if the input image is subjected to deformation such as shift, rotation or scaling, the deformed image can be recognized as being identical with the original object. Although in the above-described embodiment a back propagation model is used as the neural network 77, it is a matter of course that generalizability can also be improved to a considerable extent by using other models such as a Hopfield model.

Although in the foregoing the present invention has been described with emphasis placed on the achievement of an improvement in generalizability related to shift deformation in addition to an improvement in generalizability related to rotation and scaling deformation, which is achieved by use of logarithmic polar coordinate transformation, it should be noted that the present invention is not necessarily limited to the above-described use application. It will be apparent that similar advantageous effects are produced by combining the present invention with other type of transformation. Further, an ordinary image processing device may be used in place of the recognition device to construct a line-of-sight switching apparatus, a line-of-sight switching autofocus mechanism for ordinary imaging devices, etc. In such a case, further advantages can be expected, as a matter of course.

As will be clear from the foregoing description, the object position detecting method and apparatus and image processing system of the present invention are arranged to detect an amount of shift from the optical axis of input information on an object of recognition and send the object information to a recognition device after the object information has been moved onto the optical axis. Accordingly, it is possible to realize an improvement in generalizability related to shift deformation without a deficiency of information. If a coordinate transformation optical system that performs logarithmic polar coordinate transformation is used as the recognition device in combination with a correlation optical system or a neural network, it is possible to recognize with high accuracy even an image subjected to deformation such as shift, rotation or scaling.

What I claim is:

1. An object position detecting method comprising a step of detecting a position of an input object image using a convolution image, which is formed by performing an inverse Fourier transform on overlapping Fourier transform images of an input object image.

2. An object position detecting method comprising steps of:

reading a Fourier transform hologram of an input object image by use of Fourier transform information of said input object image to obtain read information;

performing an inverse Fourier transform on said read information to obtain convolution image information of said input object image; and detecting a position of said input object image using said convolution image information.

3. An object position detecting apparatus comprising:

means for taking an object image into said apparatus as an input object image;

Fourier transform means for performing a Fourier transform on said input object image taken into said apparatus to obtain Fourier transform information;

means for generating a reference beam for producing a hologram using a desired carrier;

recording means for recording a wavefront formed by an interference between said Fourier transform information of said input object image and said reference beam, thereby recording a Fourier transform hologram;

means for reading said recorded Fourier transform hologram using said Fourier transform information of said input object image to obtain read information;

means for subjecting said read information to inverse Fourier transformation to obtain convolution image information of said input object image; and means for detecting said convolution image of said input object image.

4. An object position detecting apparatus according to claim 3, wherein said recording means is an optically addressed spatial light modulator.

5. An object position detecting apparatus, comprising:

means for taking an object image into said apparatus as an input object image;

Fourier transform means for performing a Fourier transform on said input object image taken into said apparatus to obtain Fourier transform information;

means for generating a reference beam for producing a hologram using a desired carrier;

recording means for recording a wavefront formed by an interference between said Fourier transform information of said input object image and said reference beam, thereby recording a Fourier transform hologram;

means for reading said recorded Fourier transform hologram using said Fourier transform information of said input object image to obtain read information;

means for subjecting said read information to inverse Fourier transformation to obtain convolution image information of said input object image;

means for detecting said convolution image of said input object image;

beam splitting means for splitting a light beam into a beam for writing to said recording means and a beam for reading from said recording means, said beam splitting means being disposed between said Fourier transform means and said recording means; and an image correcting prism interposed in one of an optical path of said write beam and an optical path of said read beam.

6. An object position detecting apparatus, comprising:

means for taking an object image into said apparatus as an input object image;

Fourier transform means for performing a Fourier transform on said input object image taken into said apparatus to obtain Fourier transform information;

means for generating a reference beam for producing a hologram using a desired carrier;

recording means for recording a wavefront formed by an interference between said Fourier transform information of said input object image and said reference beam, thereby recording a Fourier transform hologram;

means for reading said recorded Fourier transform hologram using said Fourier transform information of said input object image to obtain read information;

means for subjecting said read information to inverse Fourier transformation to obtain convolution image information of said input object image;

means for detecting said convolution image of said input object image; and a polarizer disposed in front of a write beam entrance side of said recording means and behind semitransparent reflecting means for reflecting said write beam and transmitting said reference beam.

7. An object position detecting apparatus, comprising:

means for taking an input object image into said apparatus;

means for performing a Fourier transform on said input object image taken into said apparatus to obtain Fourier transform information;

means for squaring said Fourier transform information of said input object image obtained by said Fourier transform means without changing an amplitude and phase of said Fourier transform information, to obtain squared Fourier transform information;

means for subjecting said squared Fourier transform information to inverse Fourier transform to obtain convolution information of said input object image; and means for detecting said convolution of said input object image.

8. An image processing system, comprising:

imaging means for forming an optical image of an input object as an optical image, said imaging means including an imaging optical system and photoelectric transducer means for converting said formed optical image into an electric signal to obtain an input object image signal; and object position detecting means for detecting a position of said input object, said object position detecting means including:

means for taking said input object image signal into said system, means for performing a Fourier transform on said input object image represented by said input object image signal taken into said system, to obtain Fourier transform information, means for generating a reference beam for producing a hologram using a desired carrier, means for recording a wavefront formed by an interference between said Fourier transform information of said input object image represented by said input object image signal and said reference beam, thereby recording a Fourier transform hologram, means for reading said recorded Fourier transform hologram using said Fourier transform information of said input object image to obtain read information, means for subjecting said read information to inverse Fourier transform to obtain convolution image information of said input object image, and means for detecting said convolution image of said object image.

9. An image processing system, comprising:

imaging means for forming optical image of an input object as an optical image, said imaging means including an imaging optical system and photoelectric transducer means for converting said formed optical image into an electric signal to obtain an input object image signal; and object position detecting means for detecting a position of said input object, said object position detecting means including:

means for taking said input object image signal into said system, means for performing a Fourier transform on said input object image represented by said input object image signal taken into said system to obtain Fourier transform information, means for squaring said Fourier transform information without changing an amplitude and phase of said Fourier transform information, to obtain squared Fourier transform information, means for subjecting said squared Fourier transform information to inverse Fourier transform to obtain convolution image information of said input object image, and means for detecting said convolution image of said input object image.

10. An image processing system, comprising:

imaging means for inputting information of an input object as an input object image;

object position detecting means for detecting a position of said input object, said object position detecting means including:

means for taking said input object image into said system, means for performing a Fourier transform on said input object image to obtain Fourier transform information, means for generating a reference beam for producing a hologram using a desired carrier, means for recording a wavefront formed by an interference between said Fourier transform information and said reference beam, thereby recording a Fourier transform hologram, means for reading said recorded Fourier transform hologram using said Fourier transform information of said input object image to obtain read information, means for subjecting said read information to an inverse Fourier transform to obtain convolution image information of said input object image, and means for detecting said convolution image of said input object image; and means for moving said imaging means on a basis of said position of said input object obtained by said object position detecting means.

11. An image processing system, comprising:

imaging means for inputting information of an input object as an input object image;

object position detecting means for detecting a position of said input object, said object position detecting means including:

means for taking said input object image into said system, means for performing a Fourier transform on said input object image taken into said system to obtain Fourier transform information, means for squaring said Fourier transform information without changing an amplitude and phase of said Fourier transform information, to obtain squared Fourier transform information, means for subjecting said squared Fourier transform information to an inverse Fourier transform to obtain convolution information of said input object image, and means for detecting said convolution of said input object image; and means for moving said imaging means on a basis of said position of said input object obtained by said object position detecting means.

12. An image processing system, comprising:

imaging means for inputting information of an input object as an input object image;

object position detecting means for detecting a position of said input object, said object position detecting means including:

means for taking said input object image into said system, means for performing a Fourier transform on said input object image taken into said system to obtain Fourier transform information, means for generating a reference beam for producing a hologram using a desired carrier, means for recording a wavefront formed by an interference between said Fourier transform information and said reference beam, thereby recording a Fourier transform hologram, means for reading said recorded Fourier transform hologram using said Fourier transform information to obtain read information, means for subjecting said read information to an inverse Fourier transform to obtain convolution image information of said input object image, and means for detecting said convolution image of said input object image;

moving means for moving said imaging means on a basis of said position of said object obtained by said object position detecting means to thereby move said input object onto an optical axis; and means for performing recognition on a basis of information of said input object moved onto said optical axis by said moving means.

13. An image processing system, comprising:

imaging means for inputting information of an input object as an input object image;

object position detecting means for detecting a position of said input object, said object position detecting means including:

means for taking said input object image into said system, means for performing a Fourier transform on said input object image taken into said system to obtain Fourier transform information, means for squaring said Fourier transform information without changing an amplitude and phase of said Fourier transform information, to obtain squared Fourier transform information, means for subjecting said squared Fourier transform information to an inverse Fourier transform to obtain convolution information of said input object image, and means for detecting said convolution of said input object image; moving means for moving said imaging means on a basis of said position of said object obtained by said object position detecting means to thereby move said input object onto an optical axis; and means for performing recognition on a basis of information of said input object moved onto said optical axis by said moving means.

14. An object position detecting method comprising steps of:

reading a Fourier transform hologram of an input object image by use of Fourier transform information of said input object image to obtain read information;

subjecting said read information to an inverse Fourier transform to obtain zero-order component information of said input object image; and detecting a position of said input object image using said zero-order component.

15. An object position detecting apparatus, comprising:

means for taking an input object image into said apparatus;

means for performing a Fourier transform on said input object image taken into said apparatus to obtain Fourier transform information;

means for generating a reference beam for producing a hologram using a desired carrier;

means for recording a wavefront formed by an interference between said Fourier transform information and said reference beam, thereby recording a Fourier transform hologram;

means for reading said recorded Fourier transform hologram using said Fourier transform information to obtain read information;

means for subjecting said read information to an inverse Fourier transform to obtain zero-order component information of said input object image; and means for detecting said zero-order component of said input object image.

* * * * *